June 17, 1958 A. G. BRENDEL 2,839,133
SPRAY DRYING PROCESS
Original Filed July 21, 1949 3 Sheets-Sheet 1

INVENTOR
ARMIN G. BRENDEL,
BY
ATTORNEY

June 17, 1958  A. G. BRENDEL  2,839,133
SPRAY DRYING PROCESS

Original Filed July 21, 1949  3 Sheets-Sheet 3

INVENTOR
ARMIN G. BRENDEL,
BY
ATTORNEY

United States Patent Office 2,839,133
Patented June 17, 1958

2,839,133
SPRAY DRYING PROCESS

Armin G. Brendel, Suffern, N. Y., assignor to American Cyanamid Company, New York, N. Y., a corporation of Maine Original application July 21, 1949, Serial No. 105,943, now Patent No. 2,644,516, dated July 7, 1953. Divided and this application January 27, 1953, Serial No. 333,549

1 Claim. (Cl. 159—48)

This invention relates to a process for drying solid material dissolved or suspended in a liquid. The principal object of the invention is to provide a method for this purpose which will produce a spray dried product of fine particle size and, if desired, of improved sphericity. A still further object is to provide a spray drying method which can be operated at very high capacity. Another object is the provision of a spray drying method that can be carried out in units of large size, with a corresponding reduction in cost per pound of spray dried material. Other objects will become apparent from the following detailed description of preferred embodiments of the invention when taken with the appended claim.

Although not limited thereto, the process of the invention is particularly well adapted for the spray drying of slurries containing gelatinous silica, including silica-alumina, silica-magnesia and silica-alumina-magnesia compositions for use in the catalytic cracking of petroleum hydrocarbons. For this reason the invention will be described in detail with particular reference to the spray drying of this class of materials; it being understood, however, that slurries or solutions of other solid or semisolid material may be dried therein.

In the spray drying of silica slurries for the production of microspheroidal cracking catalysts a two-phase slurry consisting of water containing small globules of hydrated silica, silica-alumina, silica-magnesia and the like is dispersed into a current of hot gases in a spray drying chamber. Usually the slurry is dispersed by discharging it onto a rapidly rotating vaned spray wheel mounted in the top of the drying chamber. A current of hot gases, such as hot products of combustion, is admitted tangentially at the periphery of the chamber and forms a rotating vortex into which the spray of silica slurry is projected by centrifugal force. In a process of this type the evaporation of the water or other liquid component of the slurry takes place solely by the sensible heat of the gases, so that these gases are rapidly cooled. The drying capacity of the apparatus is therefore limited by the amount of heat that can be introduced in the drying gases.

In accordance with the present invention the spray of material to be dried is subjected to radiant heat as well as to the sensible heat of the gases, whereby a number of improvements are obtained. I have found that by introducing radiant heat into the top of the spray drying chamber, where the major part of the water evaporation takes place and the solid material assumes its final form, a much faster drying rate is achieved. This results in the formation of microspheres of improved sphericity and smaller average particle size; it also increases the capacity of the apparatus so that a greater quantity of spray dried material can be produced in an apparatus of any given size per unit of time. Furthermore, the introduction of radiant heat over the entire top surface of the spray drying chamber has enabled me to obtain a dried product of uniformly small particle size in apparatus of relatively large diameter, with a further increase in drying capacity. By so increasing the diameter of the spray drying chamber, I am enabled to employ a motor for the spray wheel of more than twice the power of those that have previously been used, with a corresponding increase in the amount of slurry that can be dispersed and spray dried per unit of time.

In addition to the above operating advantages, certain structural advantages in the design of the spray drying equipment are also obtained by the present invention. Principal among these is the simplification and elimination of duct work that results from mounting the furnace on the top of the spray drying chamber. While I am not the first to suggest the location of a furnace in this position (see U. S. Patent No. 1,782,822 to Hechenbleikner), my present construction retains all of the advantages pointed out in the Hechenbleikner patent and also presents further improvements resulting in the increased drying rate and finer particle size of the spray dried product noted above.

The invention will be further described with reference to the specific embodiment thereof shown in the attached drawings in which.

Figure 1:
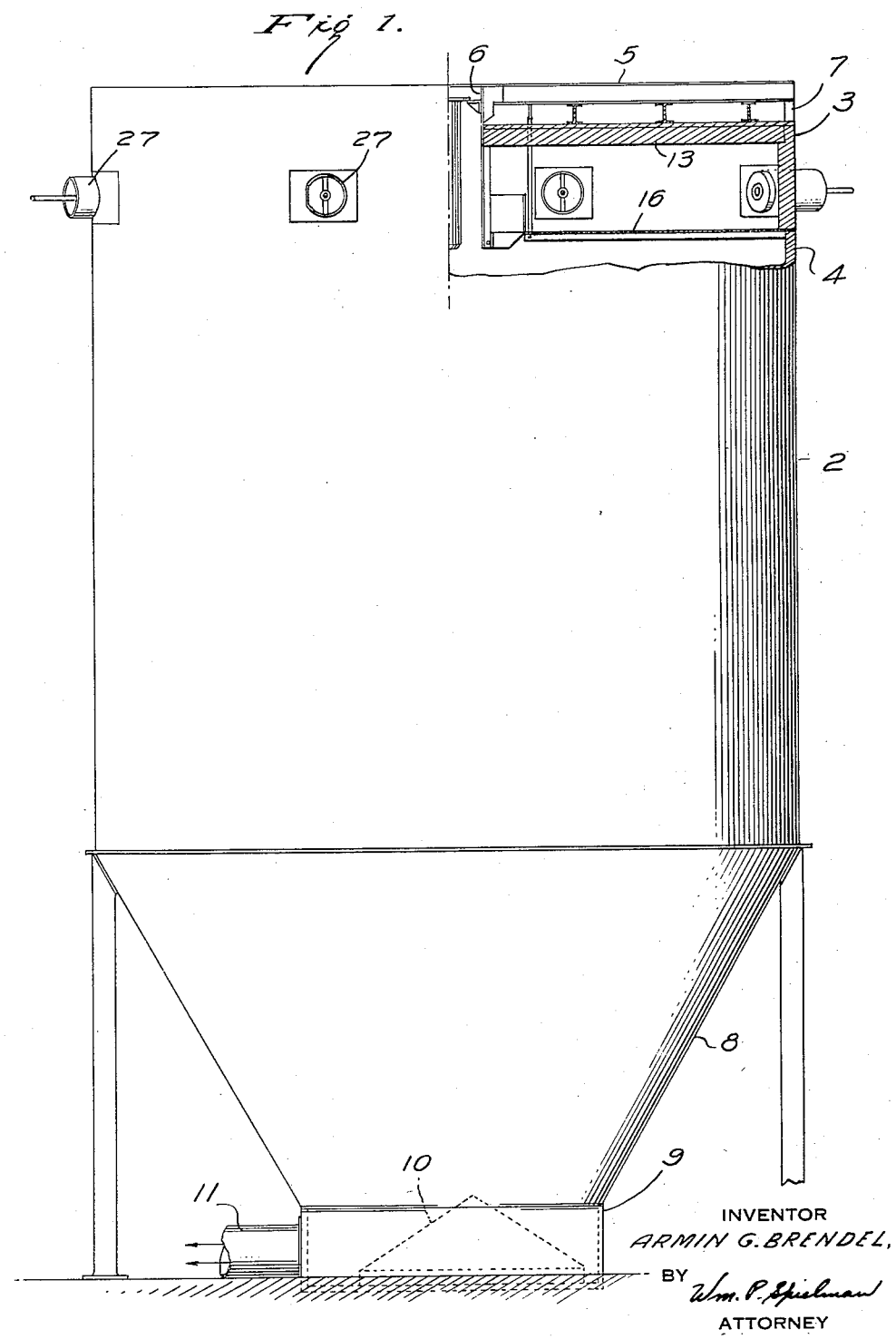
Fig. 1 is a side view of a spray drier and furnace embodying the invention with a portion of the furnace shown in section.
Figure 2:
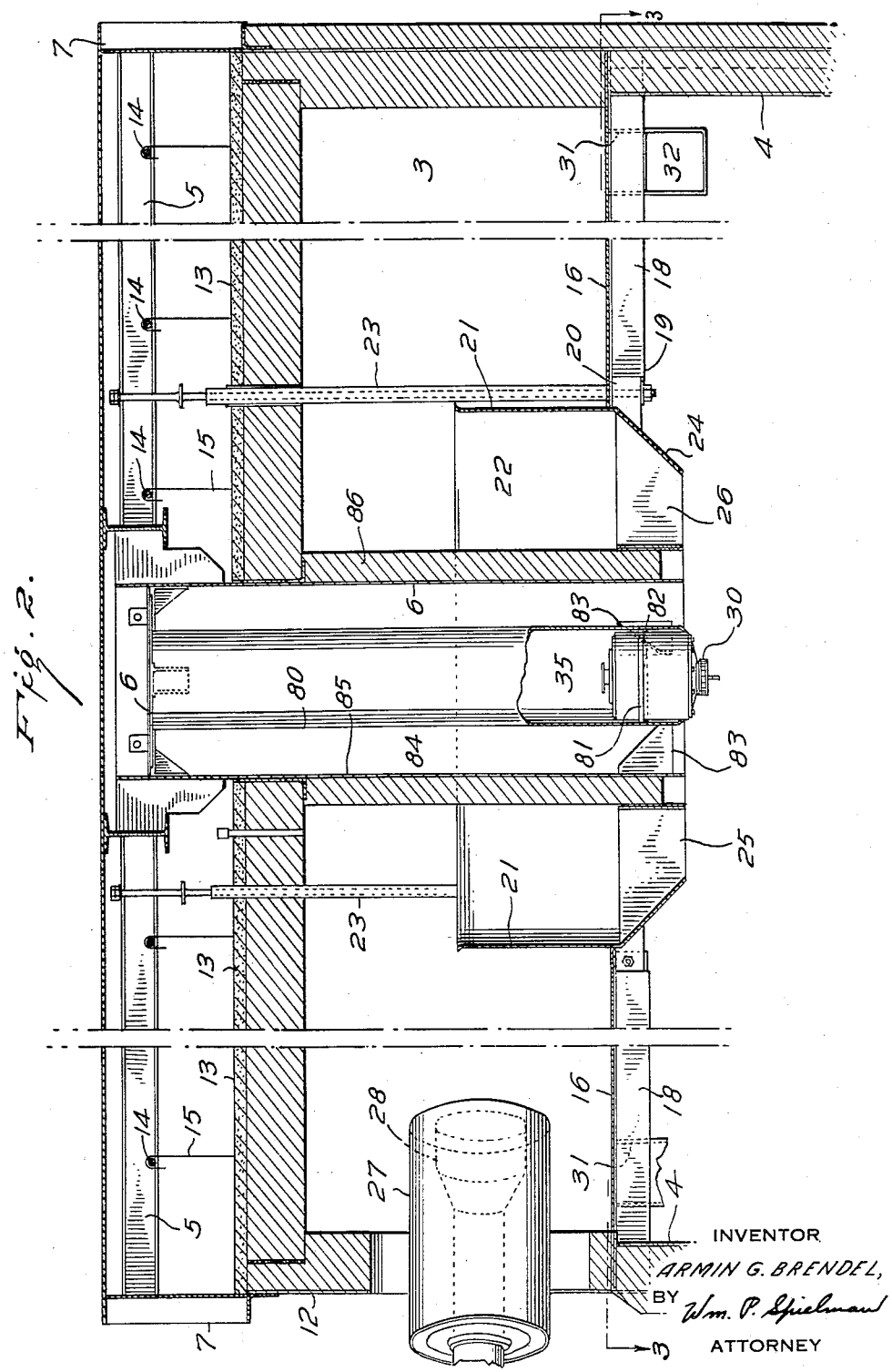
Fig. 2 is a vertical section through the furnace and top portion of the spray drier with parts broken away, the section being taken on the line 2—2 of Fig. 3.

Referring to Figs. 1 and 2 it will be seen that the assembly indicated generally by reference numeral 1 consists of a drying chamber 2 having a furnace 3 superimposed thereon, both being enclosed by a cylindrical side wall 4. Supporting beams 5 carrying a central well structure 6 are mounted on the top of this wall, as by vertical beams 7. The lower portion of the drying chamber is preferably conical, as at 8, and terminates in a cylindrical outlet 9 containing an eccentrically mounted deflecting cone 10 surrounded by a duct 11. This duct leads to a set of centrifugal separators being connected in turn with an exhaust blower for drawing gases through the apparatus. A scrubber irrigated by water sprays may follow the exhaust blower when complete recovery of all of the dried material is desired.

Figure 3:
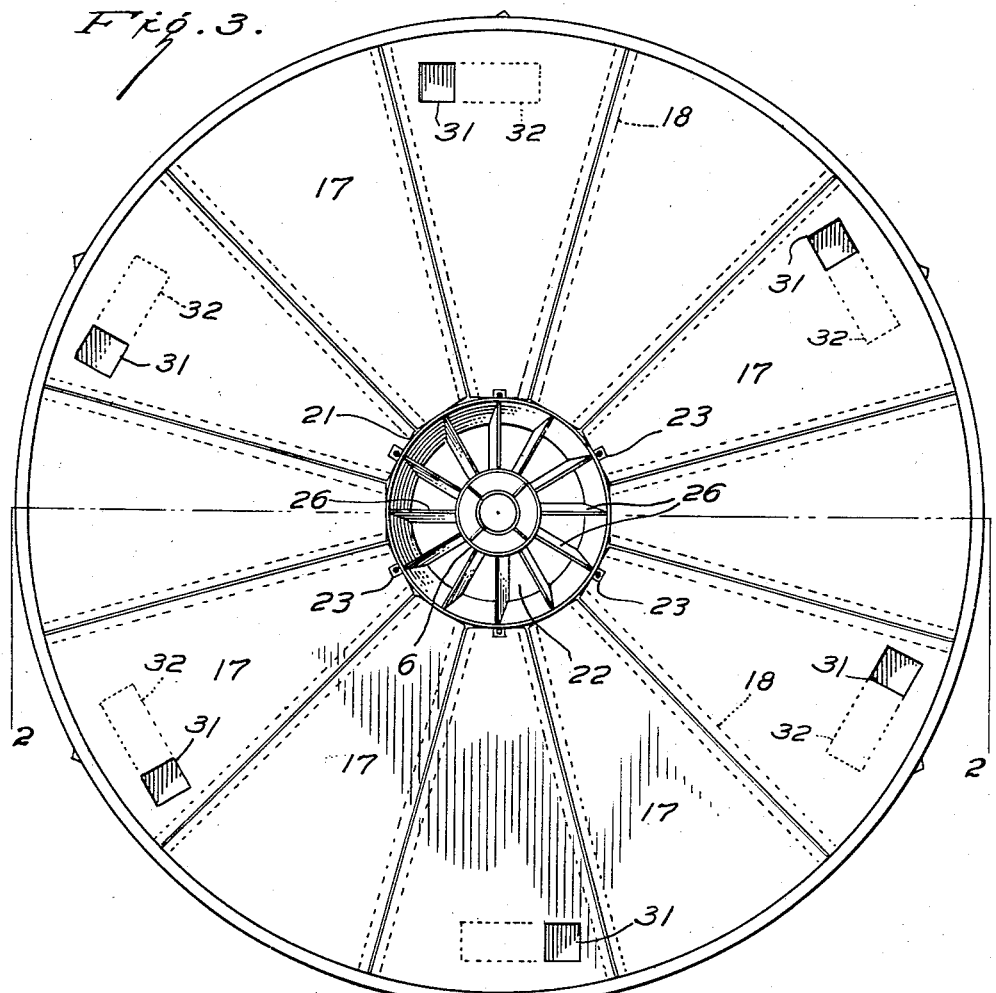
Fig. 3 is a horizontal section on the line 3—3 of Fig. 2 with the motor and spray wheel in raised position.

As is shown most clearly in Figs. 2 and 3 the furnace 3 is formed within the top portion 12 of the side wall 4 by an insulated ceiling 13, which is suspended from the supporting beams 5 by rods 14 and hangers 15, and an imperforate heat-radiating metal partition 16 which constitutes a floor for the furnace and a horizontal ceiling for the spray drying chamber. This metal partition serves the important function of radiating heat from the furnace into the particles of material in the upper portion of the spray drying chamber while preventing the uncontrolled admixture of additional quantities of hot gases therewith, which increases the drying capacity of the apparatus and aids in forming a spray-dried material of controlled shape and particle size.

The partition 16 is made up of a set of metal plates 17 laid on an equal number of radial beams 18 which are supported at their outer ends by the side wall 4. At their inner ends 19 these beams are joined as at 20 to a vertical annular baffle 21, which is spaced outwardly from the central well 6 and forms therewith an annular passage 22. The baffle 21 and the inner ends of the beams 19 are supported by a ring of insulated rods 23 which extend through the ceiling of the furnace and are hung from the supporting beams 5. Near its lower edge, and preferably below the level of the beams 18, the baffle is inclined inwardly at 24 to form a restricted portion 25 in which a set of inclined gas-directing vanes 26 is mounted.

Set in the outer wall 12 of the furnace are a number of burner tunnels 27, each enclosing a gas burner 28.

These tunnels and burners are set at an angle between the radius and the tangent to the wall of the furnace, so that the flames from the burners travel through a spiral path. It will be noted from Fig. 2 that the burners are mounted relatively close to the metal floor 16, so that this floor soon becomes very hot and radiates a substantial proportion of the heat from the burners directly into the drying space below with a corresponding reduction in the burner gas temperatures. The partially cooled products of combustion, at the end of their spiral path around the furnace, pass upwardly over the vertical baffle 21 and downwardly through the spaces 22 and 25 at temperatures of about 600° to 1400° F. and preferably at about 1400° F., being deflected by the vanes 26 into a vertically rotating path.

Figure 4:
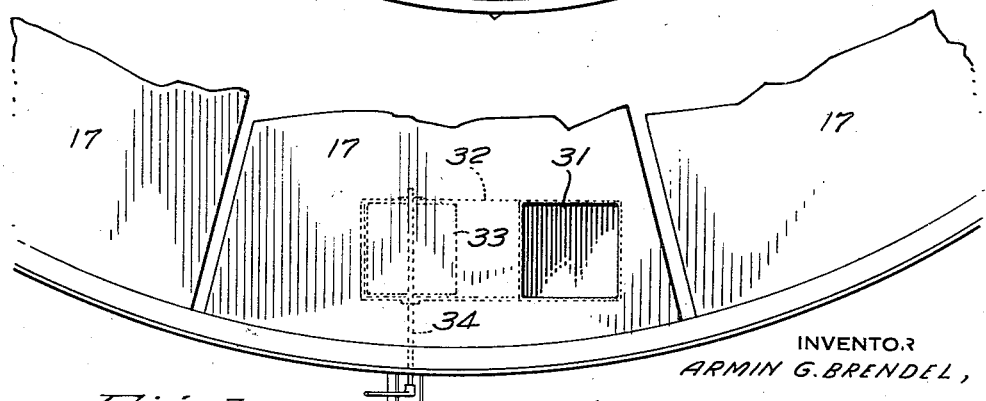
Fig. 4 is an enlarged portion of Fig. 3.

Under some conditions of operation it may be advisable to admit hot gases from the furnace 3 to the peripheral portion of the drying chamber 2. In order to accomplish this purpose a set of supplementary gas passages 31 is provided in the partition 16. Each of these passages is fitted with a connecting pipe 32 containing a damper 33 operating on a rod 34 that extends through the outer wall of the spray drying chamber, so that the damper can be opened, closed or adjusted from outside as is shown in Fig. 4 of the drawings. By suitable operation of these dampers the possibility of a dead air space in the outer upper portions of the spray drying chamber is avoided.

As has been stated, the drying capacity of the apparatus of the present invention is such that a spray machine can be used having a greater power output than any heretofore employed for this purpose. Such a machine is shown at 35 on Fig. 2 of the drawings.

The spray machine 35 is adapted to fit closely within a vertical cylinder 80 in the central well structure 6, and is provided with an outer flange 81 which rests on an inner shoulder 82 in the cylinder 80 when the motor and spray wheel are in operative position. The central cylinder 80 is braced against vibration by a set of brackets 83 which span the annular space 84 between the inner cylinder 80 and the outer, insulated cylinder 85 of the central well structure 6. It will thus be seen that the spray machine is protected from the heat of the furnace, first by a layer of insulation 86 on the inner wall of the furnace and then by the air space 84.

The advantages of my process are best shown by a specific example of results which have been obtained herein. A slurry of a hydrated silica-alumina catalyst, containing 87% of silica and 13% of alumina on the dry basis and prepared by suspending in water a precipitated, filtered and washed silica-alumina produced as described in the patent of K. D. Ashley and A. O. Jaeger, No. 2,478,519 dated August 9, 1949, was supplied at a solids content of about 6.8–8.0%. Natural gas was used as fuel in the furnace 3, which furnace contained 6 gas burners each having a capacity of 6,000,000 B. t. u. per hour. The gas flow was estimated at 2380 lbs. per minute, based on the heat balance and the air-to-gas ratio was adjusted to maintain temperatures of 1600°–1800° F. at the burner tunnels 27. The outlet gas temperature in the pipe 11 was 250° F. The following operating results were obtained when a 9-inch diameter, 45° V-type spray wheel was used.

| Atomizing Speed, R. P. M. | 10,700 | 10,700 | 12,700 | 10,700 | 12,700 |
|---|---|---|---|---|---|
| Side Inlet Dampers 33 | open | closed | open | open | closed |
| Gas Temp. (° F.) in Passage 25 | 710 | 750 | 640 | 640 | 600 |
| Screen Analysis: | | | | | |
| —40 mesh, percent | 100 | 100 | 100 | 100 | 100 |
| —100 mesh percent | 95 | 97 | 99 | 99 | 100 |
| —200 mesh percent | 62 | 71 | 84 | 73 | 85 |
| —40 microns, percent | 28 | 31 | 40 | 30 | 43 |
| —20 microns, percent | 6 | 6 | 8 | 7 | 9 |
| —10 microns, percent | 0 | 0 | 0 | 0 | 2 |
| Water Content of Product, Percent | 13 | 14 | 13 | 12 | 12 |

From the foregoing it will be seen that the essential features of my invention consist in the steps of discharging hot combustion gases across one or more surfaces of a heat-radiating metal partition an opposite side of which is so positioned as to radiate heat into the drying chamber, thereby partially cooling the hot gases by transmitting their excess heat directly to the spray drying operation, followed by projecting the material to be dried into the partially cooled gases. These principles can be embodied in a variety of types of equipment other than that which has been specifically described. Thus, for example, the natural gas or other fuel may be burned in juxtaposition to one or more vertical heat-radiating partitions surrounding the upper part of the spray drying chamber at temperatures of 1600°–2300° F. and the resulting hot gases may then be passed over the partition 16 and down through the central gas passage 25. Another embodiment could employ a ring of heat-radiating tubes, closed at their lower ends and suspended from the central areas of the plates 17 and projecting downwardly into the upper portion of the spray drying chamber, these tubes having gas burners positioned therein, whereby a large proportion of the heat of combustion would be radiated directly into the spray drying chamber. In this case the partially cooled gases leaving the open upper ends of the combustion tubes would likewise pass over the partition 16 and downwardly through the central orifice 25 after which the material to be spray dried would be injected therein. These and other types of apparatus suitable for practicing the invention will be evident to those skilled in the art from the foregoing description.

This is a division of my copending application Serial No. 105,943 filed July 21, 1949 now U. S. Patent No. 2,644,516 issued July 7, 1953.

What I claim is:

A method of spray drying an aqueous two-phase slurry composed of water containing small globules of a hydrated siliceous gel which comprises generating hot gases having a temperature of about 1600°–2300° F. by burning fuel in juxtaposition to the outer edge of the upper surface of a horizontal metal partition having a centrally located outlet therein and passing them thereacross in a spiral path to said centrally located outlet, thereby simultaneously heating said partition uniformly to heat-radiating temperatures and partially cooling said gases to about 600°–1400° F., passing the partially cooled gases downwardly through said outlet while simultaneously projecting into the gases passing through said outlet a spray of droplets of said two-phase hydrated silica gel slurry and passing the resulting mixture downwardly from said outlet while subjecting it to the radiant heat emitted by the opposite side of said partition and thereby simultaneously evaporating the water from the slurry and converting the silica to a hardened gel.

References Cited in the file of this patent

UNITED STATES PATENTS

| | | |
|---|---|---|
| 1,648,937 | Dickerson | Nov. 15, 1927 |
| 1,711,306 | Bowen | Apr. 30, 1929 |
| 1,713,237 | Morin | May 14, 1929 |
| 1,722,175 | Bowen | July 23, 1929 |
| 1,778,310 | Covlling et al. | Oct. 14, 1930 |
| 1,779,296 | Spross | Oct. 21, 1930 |
| 1,782,822 | Hechenbleikner | Nov. 25, 1930 |
| 1,875,755 | Noyes | Sept. 6, 1932 |
| 2,396,689 | Davis | Mar. 19, 1946 |
| 2,473,035 | Meade et al. | June 14, 1949 |
| 2,478,779 | Pieper | Aug. 9, 1949 |
| 2,506,646 | Komline | May 9, 1950 |
| 2,562,473 | Mojonnier | July 31, 1951 |
| 2,584,973 | Andermatt | Feb. 12, 1952 |
| 2,644,516 | Brendel | July 7, 1953 |